(12) United States Patent
Kroll et al.

(10) Patent No.: US 8,379,079 B2
(45) Date of Patent: Feb. 19, 2013

(54) HOLOGRAPHIC RECONSTRUCTION SYSTEM WITH A TRACKING DEVICE FOR THE RECONSTRUCTION

(75) Inventors: Bo Kroll, London (GB); Armin Schwerdtner, Dresden (DE); Jean-Christophe Olaya, Berlin (DE)

(73) Assignee: SeeReal Technologies S.A., Munsbach (LU)

( * ) Notice: Subject to any disclaimer, the term of this patent is extended or adjusted under 35 U.S.C. 154(b) by 572 days.

(21) Appl. No.: 12/601,012

(22) PCT Filed: May 15, 2008

(86) PCT No.: PCT/EP2008/055982
§ 371 (c)(1),
(2), (4) Date: Nov. 20, 2009

(87) PCT Pub. No.: WO2008/142000
PCT Pub. Date: Nov. 27, 2008

(65) Prior Publication Data
US 2010/0149313 A1  Jun. 17, 2010

(30) Foreign Application Priority Data
May 21, 2007  (DE) .......................... 10 2007 025 069

(51) Int. Cl.
*G03H 1/08* (2006.01)
(52) U.S. Cl. ....................................................... 348/40
(58) Field of Classification Search .................... 348/40
See application file for complete search history.

(56) References Cited

U.S. PATENT DOCUMENTS

| | | | | |
|---|---|---|---|---|
| 5,793,503 A * | 8/1998 | Haines et al. | ...................... | 359/9 |
| 5,850,352 A * | 12/1998 | Moezzi et al. | ................ | 345/419 |
| 6,952,204 B2 * | 10/2005 | Baumberg et al. | ............ | 345/420 |
| 7,230,746 B2 * | 6/2007 | Cameron et al. | ................... | 359/9 |
| 7,262,891 B2 * | 8/2007 | Brotherton-Ratcliffe et al. | ................ | 359/22 |
| 7,295,200 B2 * | 11/2007 | Cameron et al. | ............. | 345/419 |
| 7,423,792 B2 * | 9/2008 | Brotherton-Ratcliffe et al. | ................ | 359/35 |
| 7,548,360 B2 * | 6/2009 | Brotherton-Ratcliffe et al. | ................ | 359/35 |
| 7,636,184 B2 * | 12/2009 | Schwerdtner | .................... | 359/9 |
| 7,649,532 B2 * | 1/2010 | Cameron et al. | ............. | 345/419 |
| 7,768,684 B2 * | 8/2010 | Cameron et al. | ................... | 359/9 |

(Continued)

FOREIGN PATENT DOCUMENTS
WO  WO 01/95016  12/2001
WO  WO 2004/044659  5/2004

(Continued)

OTHER PUBLICATIONS

International Search Report, dated Sep. 4, 2008, issued in priority International Application No. PCT/EP2008/055982.

(Continued)

*Primary Examiner* — David Eng
(74) *Attorney, Agent, or Firm* — Saul Ewing LLP

(57) ABSTRACT

A holographic reconstruction system having spatial light modulators, an eye finder and a position control orients a propagating spatially modulated light wave field toward at least one eye position of an observer's eye, thereby reconstructing a scene in a three-dimensional manner and tracking the same during a position change of the eye position. Unobstructed lateral and axial movement of the observer head to arbitrary eye positions in a tracking region is enabled. The use of additional, planar optical components, which bring about optical aberrations during a position change of observer eyes, are prevented.

16 Claims, 4 Drawing Sheets

U.S. PATENT DOCUMENTS

| | | | |
|---|---|---|---|
| 7,929,189 B2 * | 4/2011 | Schwerdtner | 359/9 |
| 7,969,633 B2 * | 6/2011 | Schwerdtner | 359/9 |
| 2006/0250671 A1 | 11/2006 | Schwerdtner et al. | |

FOREIGN PATENT DOCUMENTS

| WO | WO 2006/066919 | 6/2006 |
|---|---|---|
| WO | WO 2006/119920 | 11/2006 |
| WO | WO 2008/025839 | 3/2008 |

OTHER PUBLICATIONS

Leister et al., "Full-color interactive holographic projection system for large 3D scene reconstruction," Proc. of SPIE, vol. 6911, 69110V-1-V10 (2008) XP007904372.

* cited by examiner

HOLOGRAPHIC RECONSTRUCTION SYSTEM WITH A TRACKING DEVICE FOR THE RECONSTRUCTION

CROSS REFERENCE TO RELATED APPLICATIONS

This application claims the priority of PCT/EP2008/055982, filed on May 15, 2008, which claims priority to German Application No. 10 2007 025069.1, filed May 21, 2007, the entire contents of which are hereby incorporated in total by reference.

FIELD OF THE INVENTION

The present invention relates to a holographic reconstruction system where a propagating modulated light wave field, which propagates to at least one eye of an observer, reconstructs a scene three-dimensionally thus making it visible for said eye. The system comprises spatial light modulator means, an eye finder and a position controller in order to direct the propagating modulated light wave field with the holographic reconstruction at the eye position of at least one observer and to track said propagating modulated light wave field to the eye position if an observer changes his eye position. The present invention relates in particular to means for adjusting the axial distance of the eye position to the reconstruction system.

The invention is independent of the way the holographic information is provided, and it can also be used in reconstruction systems which allow multiple observers to watch a holographically reconstructed video scene simultaneously.

TECHNICAL BACKGROUND OF THE INVENTION

The applicant has already disclosed a number of holographic reconstruction systems which three-dimensionally reconstruct a scene with the help of a propagating modulated light wave field, which is directed by a wave tracking means at at least one eye of an observer.

This document describes the functional principle of such a reconstruction system with the example of a light wave field which reconstructs a scene to be visible for one eye of an observer. For the other eye, the system can generate a second wave field with holographic information which differs in parallax in a space- or time-division multiplex process. However, the system can generally also provide a wave field with a sufficiently large visibility region. The systems can also generate and direct separate wave fields for multiple observers in a space- or time-division multiplex process.

A basic principle for a reconstruction system is applied for the present invention, where spatial light modulator means represent a video hologram. FIG. 1 shows a general technical problem of a reconstruction system which uses light modulator means with discrete modulator cells. In this example, the light modulator means is a single light modulator SLM, which modulates a light wave field LW which is capable of generating interference with holographic information when light shines through it, i.e. in a transmissive grid mode, or as controllable, spatially arranged micro reflectors. The light modulator SLM is dynamically encoded with holographic information of the scene. In either case, a modulated wave field is created which reconstructs the object light points of the scene after a Fourier transformation with a focussing lens L in the space in front of the focal plane FL. The focussing lens L ensures that the light emitted by all regions of the video hologram passes through the visibility region in a non-defined manner.

As in conventional holography with photographic plates or photographic film, the light modulator SLM shown in FIG. 1 also comprises the entire holographic information of the scene in each modulator cell for a conventional video hologram. After dividing a video hologram, each hologram region could holographically reconstruct the entire scene for itself, depending on the observer angle—only the angular range in which the object can be watched decreases.

However, a problem occurs if the known system encodes the holographic information for each object light point on the entire modulator surface of a two-dimensional spatial light modulator with a pixelated modulator cell structure, e.g. a liquid crystal display. In addition to each desired reconstructed object light point, additional parasitic light points, which lie in a spatial frequency spectrum, inevitably occur in further diffraction orders. FIG. 1 illustrates, in a greatly simplified manner, the selected object light point OP0 in the diffraction order used by the system and, in addition, parasitic light points OP+1 and OP−1 in the diffraction orders +1 and −1. Further parasitic light points, which are not of much interest in the context of the present invention, occur in further diffraction orders. At the position of the reconstruction, the object light point lies in a diffraction interval aligned with all parasitic light points. After the reconstruction, light wave cones propagate with periodical distances from each light point to the focal plane, and their opening angles are defined by the wavelength of the light which illuminates the modulator cells and by the distance of the modulator cells in the cell structure.

The light wave cones of all reconstructed light points OP+1, OP0 and OP−1 propagate at a wide angle, such that in a visibility region VR, which is defined in the focal plane FL by the diffraction order used for reconstructing, also light from adjacent light wave cones of the parasitic light points OP+1 and OP−1 appears, so that those light points are visible. This disturbance cannot be compensated by way of filtering.

Such a holographic reconstruction system has been described the first time by the applicant of this invention in their international publication no. WO 2004/044659, titled "Video hologram and device for reconstructing video holograms". FIG. 2 shows a possibility, known from that publication, to overcome this drawback.

In order to avoid light waves of higher diffraction orders in the visibility region, small object elements of the scene, preferably discrete object light points, which are separately reconstructed by the reconstruction system, are used for encoding the light modulator means. In the example, a computer-aided hologram processor means (not shown) reduces the encoded surface of the light modulator SLM for each object light point to a hologram region H0 in correspondence to its spatial position in front of the visibility region VR and the size of the visibility region VR. As a consequence, only light from the object light point of the used diffraction order enters the visibility region VR. The visibility region thus only lies in one diffraction order. An observer who looks with at least one eye towards the video hologram and who watches the scene, cannot see the light wave which, in this example, is emitted by the parasitic light point OP+1.

A hologram processor (not shown) of the system controller computes the surface area of each hologram region depending on the axial position of the object light point OP0 in space. This means that both the axial distance d1 from the object light point OP0 and the distance d2 from the focal plane to the light modulator SLM define the surface area of the hologram region H0. The lateral deviation of the reconstructed object light point OP0 from the optical axis of the light modulator SLM defines the position of the hologram region H0 on the surface of the light modulator SLM. In other words, size and position of each hologram region H0 are defined by imaginary connecting planes from the visibility region VR through the respective point to the modulator surface of the light modulator.

This encoding method has also been disclosed by the applicant in the international publication no. WO 2006/119920, titled "Device for holographic reconstruction of three-dimensional scenes".

FIG. 3 only shows schematically for a three-dimensional scene 3DS only those light waves which are emitted by the reconstructed object light points in the used diffraction order. This example only shows few selected object light points OP1 . . . OP4 of a scene section. The hologram processor HP encodes for each individual object light point OP1 . . . OP4 a separate hologram region H1 . . . H4 in a number of adjacent modulator cells of the light modulator SLM. Each hologram region forms in conjunction with the focussing lens L an adjustable lens, which reconstructs its object light point OP in the space between the SLM and the focal plane FL, such that its light wave propagates into the visibility region VR without leaving the used diffraction order in the focal plane FL. This prevents a perception of parasitic light points of other diffraction orders in the visibility region VR. The hologram processor HP always assigns the holographic information of an individual object light point only to a limited hologram region H of the modulator surface. Considering the data of the current eye position, which is provided by the system controller with the help of an eye finder, the hologram processor computes the position and size of each hologram region.

The two prior art reconstruction systems have the disadvantage that the reconstruction is only visible without errors from the visibility region VR, which lies in the focal plane FL. Only there, all light waves of the reconstructed object light points coincide to form a light wave field which entirely represents the reconstruction of the scene. The visibility region is of virtual nature and thus difficult to be detected for the observer without any aids. Because the reconstruction system does not have a spatial frequency filter for suppressing adjacent diffraction orders, light from parasitic light points propagates beyond the focal plane FL on to the eye pupil. This is illustrated in FIG. 5a with the example of a reconstructed object light point OP0. If an observer eye was positioned in the indicated visibility region VR2, also light from the parasitic light points OP+1 would propagate into the eye pupil and the light point OP+1 would thus be visible as a disturbing spot.

Moreover, starting at a certain magnitude, distances in either direction from the eye position to the focal plane FL cause the light waves emitted by certain hologram regions, in particular those which lie at the margin of the light modulator SLM, to not propagate to the eye pupil of the observer eye, so that these object light points are not visible at that eye position. This disadvantage is illustrated in FIG. 6a. An observer eye which is positioned in the indicated visibility region VR2 cannot see the object light point OP3 of the reconstructed scene because its light wave does not fall on the eye pupil. This fact requires the propagating wave field with the reconstruction and the visibility region VR to be directed at the current eye position and to be tracked if an observer moves his head.

Prior art holographic reconstruction systems therefore comprise an eye finder and corresponding tracking means. If the observer moves, the tracking system tracks the corresponding modulated wave field to the changed current eye position, for example by changing the active light source position. The term 'current eye position' shall be understood hereinafter as the eye position at the end of a modulated wave field, which is directed at at least one such observer eye for which the currently encoded video hologram has modulated the wave field. Example: A holographic reconstruction system provides a separately modulated wave field for each eye of an observer in a time-division multiplex process. If the system controller receives the information that two observers watch the reconstruction, it must provide these modulated light fields, one after another, for four different eye positions, where the holographic contents for the right and the left eye differ. At the point of time when the video hologram sequence provides a single hologram for a right eye, the tracking system directs the modulated wave field with the single hologram only towards the right eye of the first observer and then towards the right eye of the second observer. Thereafter, when a single hologram for a left eye is encoded, the two remaining eye positions will be addressed.

Such tracking means are relatively complicated and exhibit optical elements which severely deform the propagating wave field prior to the reconstruction of the scene. The optical tracking means track the modulated wave field at an oblique angle of incidence, which depends on the current eye position, and which can differ considerably from the optical axis of the components. Consequently, aberrations and runtime errors with fluctuating portions occur.

Those cause a position-dependent deformation of the propagating wave field and must be compensated prior to the reconstruction. Changing observer eye positions cause aberrations, such as spherical aberration, coma, field curvature, astigmatism and distortion, which are difficult to compensate due to their fluctuating portions. These deformations cause the coincidence of the light waves in the visibility region to be disturbed and individual reconstructed object light points of the scene to be reconstructed at an incorrect position or in a blurred manner, so that the scene is represented in a distorted manner or, in extreme cases, individual objects of the scene in the visibility region are even missing.

Another holographic reconstruction system, which has the object to considerably reduce the computational load when encoding the light modulator SLM, is known from the international publication WO 01/095016, titled "Computation time reduction for three-dimensional displays".

Compared with the system described above, that system uses a very high-resolution light modulator SLM and always encodes the current hologram only into a variable eye-position-specific light modulator region with a limited number of modulator cells. An eye finder determines for the control means of the system both the eye position and the details of the scene which the observer is currently watching. The control means thus define in the data of the current video hologram the modulator cells which contribute to the reconstruction of these viewed details, and compute the code values for the light modulator region, depending on the viewing direction of the observer eyes towards the display screen. In order to reduce the computational load, the system controller computes the values for the defined modulator cells with the highest priority. The system then forms a corresponding system exit pupil which reconstructs the details. The remainder of the reconstructed object which is not currently watched by the observer or which cannot be seen from the eye position is computed and updated by the system controller with low priority and/or less frequency. In correspondence with the pupil position of the observer eye, the system controller simultaneously modifies the shape, size and position of the corresponding exit pupil. The simulated object appears in a relatively small three-dimensional polyhedron, which lies around the focal plane FL of the optical reconstruction system.

Besides a relatively small reconstruction space for a reconstruction close to the focal plane FL, that prior art reconstruction system has the disadvantage, compared to the former one, that it only uses a greatly limited number of all available modulator cells of the light modulator. This redundancy greatly reduces the visibility range on to the reconstruction and requires, compared to the former system, a light modulator with a much higher resolution and, as shown in the document, an optical reconstruction system with a dimension that is larger than the light modulator. Because a fix background is missing, the system is little suitable for the reconstruction of video scenes with objects in multiple spatial depths. In that system too, the modulated wave field must propagate at an oblique angle through the optical reconstruction system. This also form a source for aberrations, which depend on changing eye positions.

SUMMARY OF THE INVENTION

It is the object of the present invention to allow with little mechanical and optical efforts the head of an observer to be freely movable towards any eye position within a tracking range, both laterally and axially in relation to the optical light exit axis of the reconstruction system. The system shall make superfluous the use of additional, particularly large-area, optical components which are an additional source for optical aberrations in the event of changing positions of observer eyes.

The present invention is based on a holographic reconstruction system which holographically reconstructs the optical appearance of a scene in three dimensions with the help of at least one propagating light wave field, which is capable of generating interference, and which is modulated with a sequence of video holograms. The reconstruction system comprises hologram processor means which compute a sequence of video holograms from holographic information of the scene which is to be holographically reconstructed. The hologram processor means discretely encode a cell structure of modulator cells which the light modulator means comprise. The description of object elements of the scene which are arranged in a structure, e.g. element colour and element brightness, serves as holographic information. The object elements are preferably discrete object light points of the scene, but may also be image segments known from the image processing technology.

A special feature of the encoding process of the reconstruction system used for this invention is that the hologram processor means assign each object element with a discrete hologram region on the cell structure and define the extent and position of the hologram region depending on information about the object position of the object element in the scene.

The hologram processor means then compute for each hologram region a code from the holographic information and from the information about the object position of the corresponding object element, and encode the cell structure accordingly.

In accordance with the hologram regions which are assigned to the cell structure, each hologram region modulates a partial light wave of the light wave field which is capable of generating interference, so that all modulated partial light waves separately reconstruct the corresponding object elements and then propagate as light wave cones into a visibility region.

The holographic reconstruction system according to the present invention additionally comprises control means which direct all modulated partial light waves at an current eye position based on eye position information, of the eye positions of at least one observer which are provided by eye finder means. It is thus achieved, that all light wave cones in the visibility region render the entirely reconstructed scene visible and track it to the eye position, if the head is moved.

The holographic reconstruction system solves the above described object with means according to the present invention in that the hologram processor means consider the eye position information of the current eye position in addition to the holographic information and the information about the object position of the assigned object element, in order to adapt the extent and position of the hologram regions to the current eye position on the one hand, and to adapt the code for the individual hologram regions dynamically such that the reconstruction system directs all modulated partial light waves with their open light wave cones at the current eye position, irrespective of the current eye position within a tracking range on the other.

It is thus achieved that the openings of the light wave cones form by way of coincidence at the current eye position a visibility region in which all reconstructed object elements render the holographic reconstruction of the scene visible without light of parasitic diffraction orders entering the used diffraction order.

Because the hologram processor means additionally also consider the eye position information of the current eye positions for encoding the cell structure, both the eye position of the observer and the visibility region for the wave field with the reconstructed scene can lie in any observer plane within a tracking range in a holographic reconstruction system according to the present invention; this means that the position of the observer eye does not have to lie in the focal plane of the reconstruction system, because a dynamic adaptation is realised through the encoding of the current video hologram.

In order to avoid disturbing influences of light from parasitic diffraction orders on the one hand, and to ensure the full visibility of all reconstructed object elements on the other, the hologram processor means dynamically adapt the extent, position and holographic content of all hologram regions to the current eye position in correspondence with the position of the object elements in front of the eye position. After the adaptation, each hologram region forms a modulated partial light wave, which, after the reconstruction with its object element, has a light wave cone with an opening at the position of the visibility region, said opening lying within the used diffraction order and widely corresponding to the geometry of the visibility region. The light of light points which occur in a parasitic manner in other diffraction orders of the diffraction interval thus remains in the corresponding diffraction orders, and these parasitic light points do not appear in the visibility region.

A major advantage of the holographic reconstruction system according to this invention is that a certain extent of the visibility region can be defined, which is similar to the extent of an observer eye, and that the hologram processor means dynamically encode the cell structure such that the extent of the visibility region remains constant irrespective of the distance in front of the spatial light modulator means at which an observer is situated. This is achieved in that the hologram processor means adapt the extent of the hologram regions on the cell structure.

SHORT DESCRIPTION OF FIGURES

The solution according to this invention will now be explained in more detail with the help of embodiments and accompanying drawings, wherein.

Figure 1:
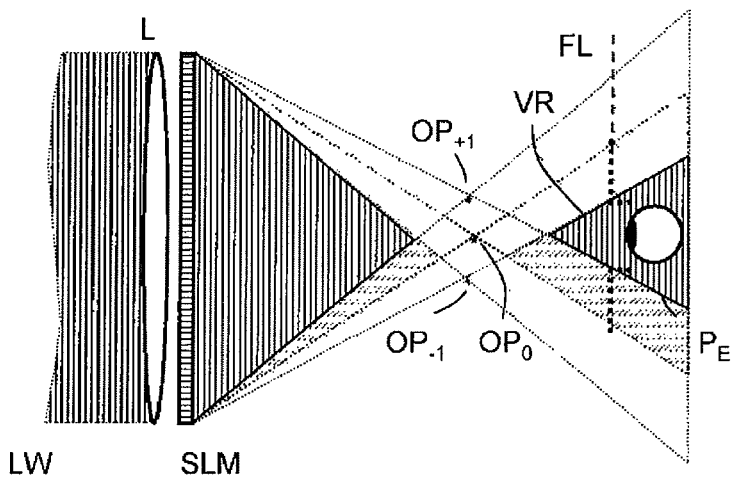
FIG. 1 shows a basic principle of a holographic reconstruction system where a video hologram is encoded on an illuminated spatial light modulator.
Figure 2:
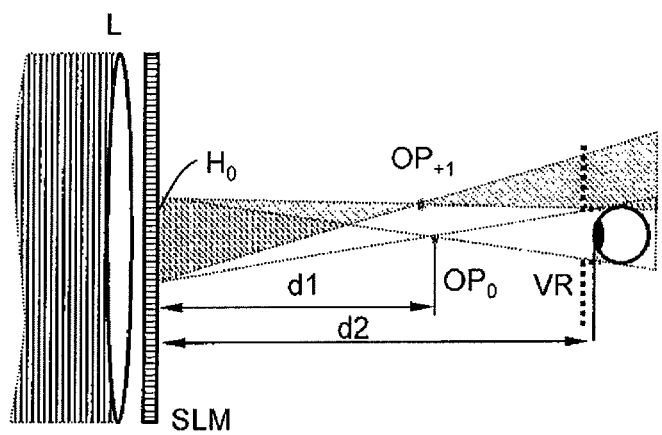
FIG. 2 shows a reconstruction system according to the international publication WO 2004/044659, on which the system according to the present invention is based, and which describes the effect of parasitic light points with example of an adjacent diffraction order for a single reconstructed object light point of the scene.
Figure 3:
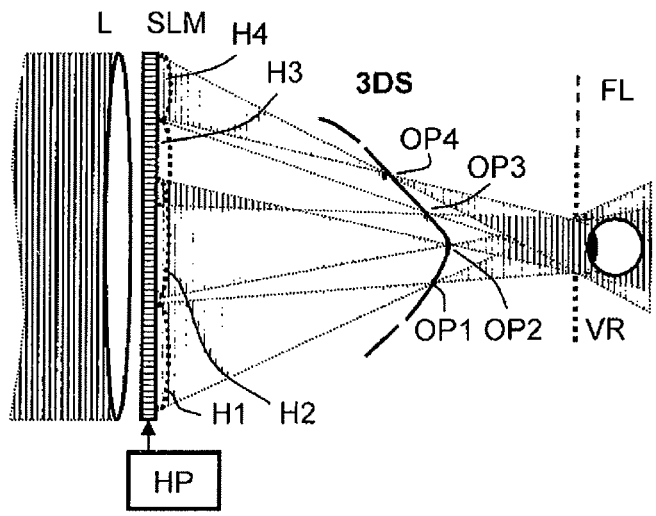

FIG. 3 also shows the holographic reconstruction system according to FIG. 2 with selected object light points of the three-dimensional scene and corresponding encoded hologram regions on the spatial light modulator.

Figure 4:
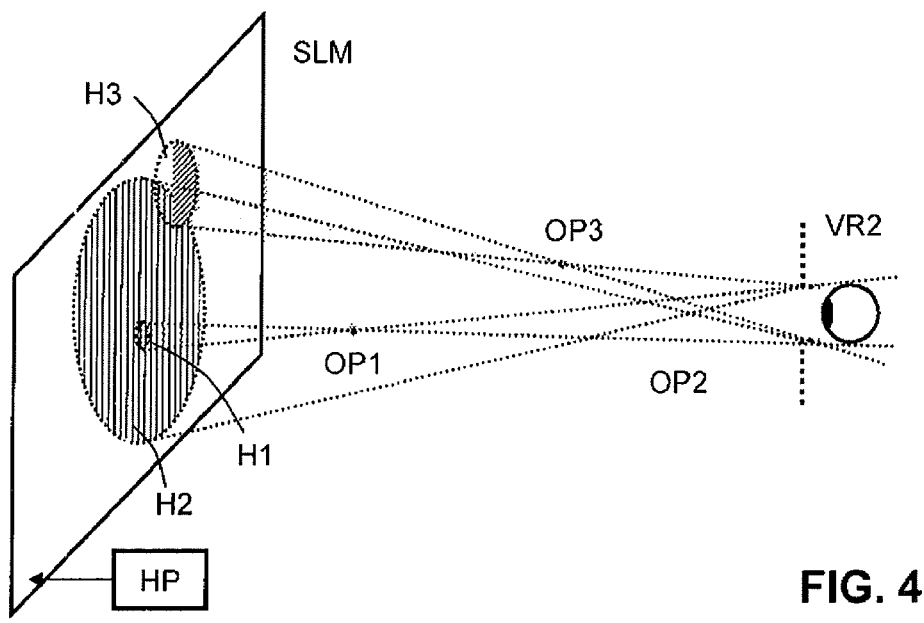

FIG. 4 is another illustration of the reconstruction system according to FIG. 2 with encoded hologram regions assigned on the surface of the light modulator for multiple examples of selected object light points.

Figure 5A:
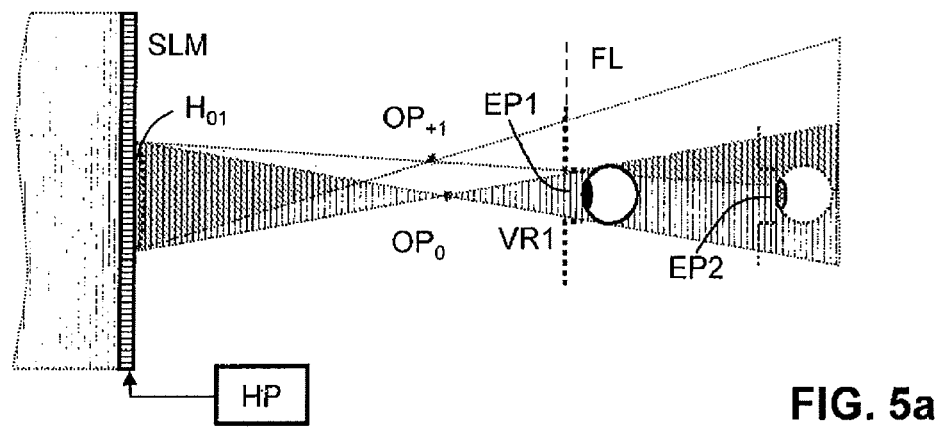
Figure 5B:
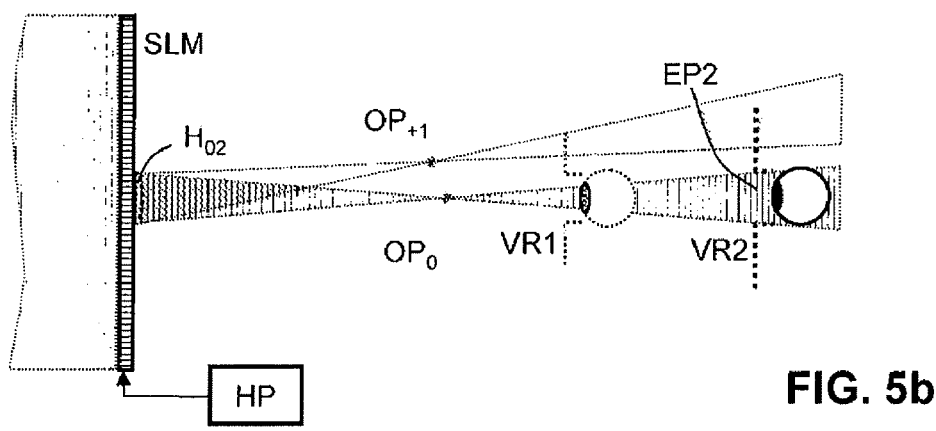

FIGS. 5a and 5b show the optical paths of a modulated partial light wave with a selected reconstructed object light point and a partial light wave with a corresponding parasitic light point in an adjacent diffraction order for different eye positions. A hologram processor has adapted the size and code of the hologram region for the modulated partial light wave to a desired eye position according to the present invention.

Figure 6A:
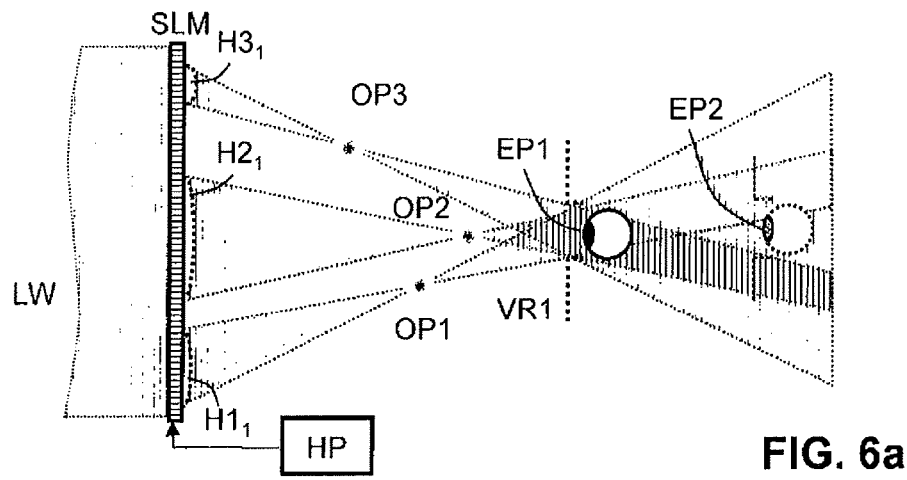
Figure 6B:
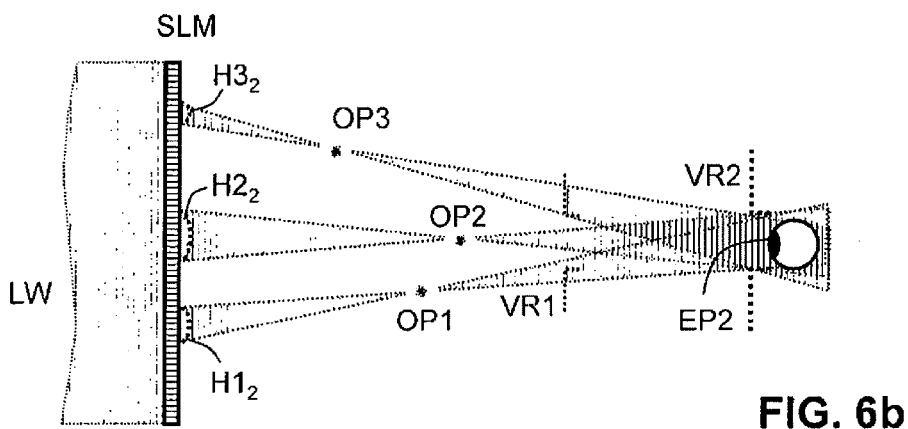
Figure 6C:
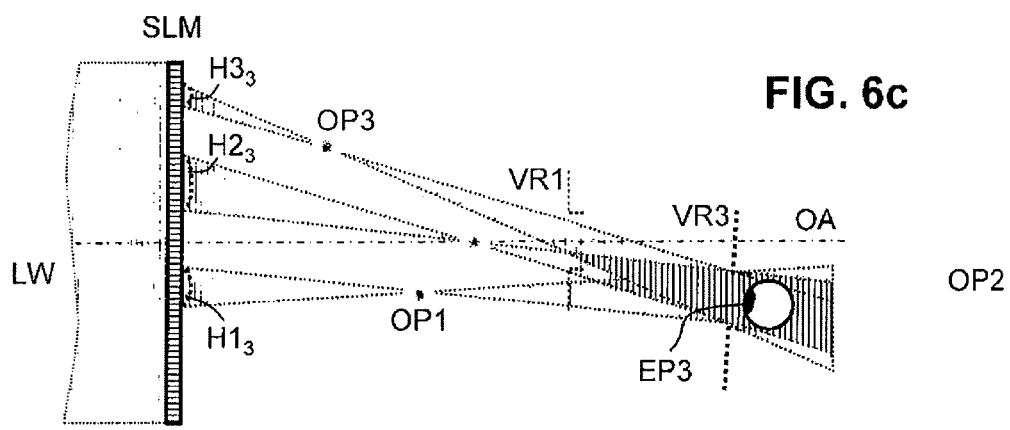

FIGS. 6a to 6c show the optical paths of modulated partial light waves with multiple selected reconstructed object light points of a scene in one diffraction order for different eye positions. The hologram processor has adapted the size, position and code of the hologram regions for the modulated partial light waves to a desired eye position according to the present invention.

Figure 7A:
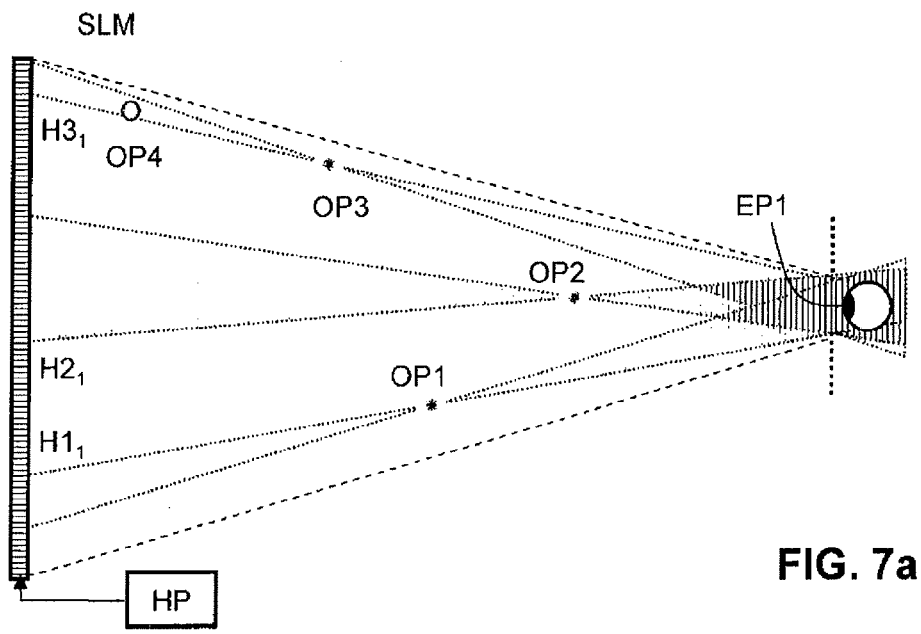
Figure 7B:
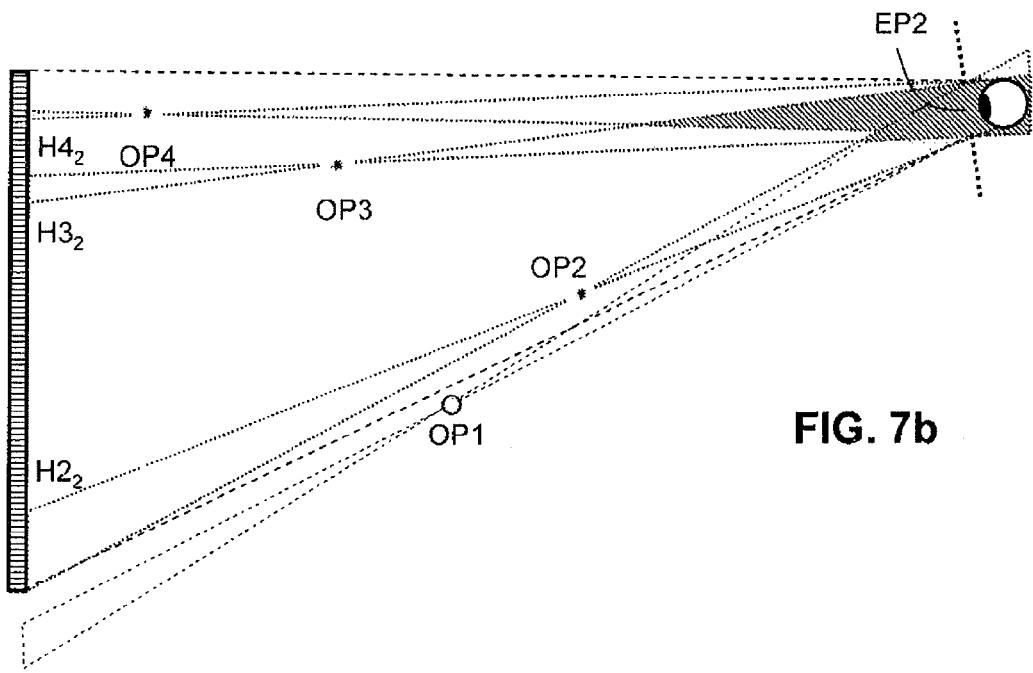

FIGS. 7a and 7b also show the optical paths of modulated partial light waves with multiple selected reconstructed object light points of a scene in one diffraction order for different eye positions. In contrast to the embodiment according to FIGS. 6a to 6c, the hologram processor also considers for the computation of the video hologram changes in the structure of the visible object light points, which are caused by the different perspectives of different eye positions.

DETAILED DESCRIPTION

The function of the reconstruction system according to the present invention can be explained with the help of lenses and prisms which are encoded as structure of focussing lens functions and optical prism functions on the cell structure of the spatial light modulator means by the hologram processor when computing the video holograms.

FIG. 4 is a perspective view illustrating how the cell structure of the spatial light modulator SLM is encoded with the help of the example of object light points OP1 to OP3, which are selected as typical examples of a three-dimensional scene.

According to the known basic principle of the present invention, the hologram processor HP defines a hologram region H1 to H3 on the cell structure for each object light point OP1 to OP3 and computes a lens term and, if necessary, a prism term for each hologram region with the help of holographic information about the object light point. This means that each hologram region on the cell structure is provided with a code which realises for the hologram a first optical component with the optical function of a separate focussing lens and in addition, if necessary, a second optical component with the optical function of a separate deflecting prism.

Because all hologram regions lie in the light wave front LW which is capable of generating interference, their codes realise spatially separated partial light waves, which separately reconstruct an object light point OP1, OP2 or OP3 each in accordance with their focussing lens functions. In order to achieve a correct reconstruction, the wave path of the modulated light must run such that all reconstructed object light points in a viewing space in front of the current eye position lie at an object position according to the scene and then run towards the eye position in a visibility region. In order to realise this, in the course of computing the hologram processor superimposes the lens term with a prism term which corresponds to the object position of the object light point. This means that each encoded hologram region provides at least one lens function which reconstructs an object light point at an axial distance to the light modulator SLM. However, for the majority of encoded hologram regions, the hologram processor additionally superimposes a prism function already while computing the code, said prism function modifying the lateral position of the reconstructed object light point.

The optical path of the modulated light waves can preferably be computed by the hologram processor HP with the help of the ray tracing method, which is known from geometrical optics and computer graphics. During computation, advantage is taken of the property of light that optical paths are reversible, so that all light waves can be traced back from the eye to the point where they originate. In the present case, the hologram processor encodes the entire modulator surface such that all light points which must be visible theoretically at a current eye position in order to perceive a correct reconstruction when watching a scene from the visibility region actually enter the visibility region VR so to form the reconstruction. Each hologram region is generated as a projection of the visibility region VR through an object light point of the scene onto the surface of the light modulator SLM, thus defining on it a hologram region for each object light point. A scene generally comprises a multitude of closely arranged object light points. As shown in FIG. 4, their hologram regions are thus overlapped. The hologram processor does not compute and encode object light points which are hidden by objects which lie in foreground when watching the scene from the current eye position. This considerably reduces the computational load for computing the current video hologram.

FIGS. 5a and 5b show the optical paths of a modulated partial light wave with a selected reconstructed object light point in the used diffraction order, and the optical path of a partial light wave with a corresponding parasitic light point in an adjacent diffraction order, respectively, each for a specific eye position. The effect of a light propagation of the conical partial light wave after the reconstruction is illustrated with the example of a selected object light point OP0. The structured cell structure of the light modulator SLM inevitably causes parasitic light points to occur in other diffraction orders. The embodiment only shows one of the parasitic light points, namely the light point OP+1 in the next higher diffraction order.

Referring to FIG. 5a, the hologram region H01 is encoded with a lens term such that a partial light wave reconstructs an object light point OP0 and makes it visible at each point of a visibility region VR1 at the eye position EP1. A light wave cone propagates from the reconstructed object light point OP0 to the eye position EP1, thus entirely filling the visibility region VR1, which fully uses the maximum possible surface in the used diffraction order. A parasitic light wave, which generates the undesired light point OP+1 in the next higher diffraction order, runs past the visibility region VR1, so that the light point OP+1 does not appear in the visibility region VR1.

The same applies accordingly to any other light point which is generated by further parasitic light waves in another diffraction order, for example the next lower one. However, for reasons of clarity, no further diffraction orders are shown in the Figures.

Things are different when the observer eye moves axially from the eye position EP1 to the eye position EP2. Because the reconstruction system works without a spatial frequency filtering which suppresses adjacent diffraction orders, light of parasitic light points would enter the eye beyond the eye position EP1, e.g. at the eye position EP2.

FIG. 5b shows the solution of this problem according to the present invention. In order to axially displace the visibility region towards the eye position EP2, the hologram processor encodes a smaller hologram region H02 with a lens function for the object light point OP0.

When encoding the hologram region H02 as shown in FIG. 5b, the modulated parasitic partial light wave for the light point OP+1 also runs past both visibility regions VR1 and VR2, so that this encoding method generally appears to be advantageous.

The reconstruction system according to the present invention has on the one hand a visibility region which is sized according to the cross-sectional areas of all light wave cones when they intersect the plane of the eye position. On the other hand, only a relatively small diffraction interval can be realised with inexpensive light modulators, depending on the used light colours. This is why the visibility region should use the maximum possible cross-sectional area in the diffraction interval in order to be able to watch the reconstruction conveniently.

FIGS. 6a to 6c only show optical paths of partial light waves for selected object light points OP1 to OP3 in the diffraction order which is used for reconstructing. Parasitic light points from other diffraction orders are omitted for reasons of clarity.

The cell structure of the spatial light modulator SLM carries for each hologram region H1, H2 and H3 a code which comprises a lens term and prism term. Each hologram region H1, H2 and H3 thus modulates a partial light wave of the light wave field LW in a spatially separated manner. As a result of constructive interference, each partial light wave separately reconstructs its corresponding object light point OP1, OP2 or OP3. After the reconstruction, the partial light waves propagate as light wave cones to the current eye position EP1, where their openings form a visibility region VR by way of coincidence. As shown in FIGS. 6a to 6c, all hologram regions H1, H2 and H3 are computed for the same pattern of object light points OP1 to OP3 which are part of the reconstruction of a scene which is situated at a fix position opposite the light modulator SLM.

FIG. 6a shows hologram regions H11, H21 and H31 with a size and position which are defined and encoded with a prism term which depends on the eye position EP1, such that all partial light waves propagate to the eye position EP1, so to form the visibility region VR1. As shown in FIG. 6a, the light wave cones of the reconstructed object light points OP1 to OP3 coincide near the eye position EP1 so to form a visibility region VR1, where all object light points are visible and form a three-dimensional reconstruction of the scene. The modulated partial light waves diverge behind the eye position EP1, so that when an eye is moved axially towards an eye position EP2, the object light points OP1 and OP3 are no longer visible, depending on the lateral position of the eye, or only due to an optical disturbance which is caused by a parasitic light point from another diffraction order.

FIG. 6b shows that when the eye has moved axially, the hologram processor HP generates a new functional visibility region VR2 by redefining the size and position of the hologram regions H12, H22 and H32 on the cell structure and by adapting the value of the encoded prism term to the eye position EP2. FIG. 6b further shows that the reconstructed object light points OP1 and OP3 are no longer visible at the position of the old visibility region VR1. However, it must be assumed that in addition to the object light points OP1 and OP3 light points (not shown) from other diffraction orders are visible at that position instead.

FIG. 6c shows an eye moving from the eye position EP1 in multiple dimensions towards an eye position EP3, which lies off the optical axis OA of the reconstruction system. Because the eye position EP3 is laterally distant from the eye position EP2, the hologram processor HP must mainly change the position of the hologram regions H13, H23 and H33 on the cell structure and compute a modified prism term for each hologram region. In order to ensure that the reconstructed scene is fixed in space in front of the current eye position if the observer moves his head sideways, all hologram regions H13, H23 and H33 on the cell structure are displaced in one direction. As a consequence, hologram regions which lie at the edge in the direction of the displacement, can no longer be encoded. Their reconstructed object light points would be missing in the reconstruction and the viewing space on to the scene is trimmed accordingly. In order to avoid this, if the observer moves sideways from one eye position to another, the hologram processor HP can generally compute and encode such information about the position of the hologram regions on the cell structure, so that the position of the reconstruction of the scene changes in relation to the light modulator SLM, such that the scene exhibits an equally large viewing space in the visibility region of each eye position. However, such a computation of the video holograms with changing position of the reconstruction of the scene will only be desired if the hologram processor HP provides the same video hologram for multiple observers in a time-division multiplex process.

However, for a real holographic reconstruction of a scene it is desired that the reconstruction of the scene remains fixed at one position if an observer moves his head, and that the hologram processor adapts the encoded detail structure of the scene to the modified perspective.

FIGS. 7a and 7b show a particularly preferred embodiment of this invention, which allows to adapt conveniently the visible holographic reconstruction to the eye perspective for any eye position in a tracking range. According to the present invention, the hologram processor HP uses for this the eye position information of the current eye position in order to check the visibility of the object light point with the help of the ray tracing method if the position of the observer eye changes, and to adapt the structure of the reconstructed object light points depending on the current eye position.

As in the preceding Figures, also in FIGS. 7a and 7b all hologram regions are computed for the same pattern of object light points OP1 to OP4, which are situated opposite the light modulator SLM at a fix position in space.

However, FIG. 7a only shows the hologram regions H11 to H31 of the object light points OP1 to OP3 and their modulated partial light waves in the used diffraction order on their optical paths to the eye position EP1. According to another feature of the present invention, prior to the computation of the current video hologram the hologram processor HP detects in a visibility check with the help of the ray tracing method that the object light point OP3 covers the object light point OP4, which lies behind, seen from the perspective of the eye position EP1. This is why the signal processor does neither define a hologram region for the object light point OP4 nor does it compute any code. The hologram processor HP thus saves computational load.

Things are different when the observer eye is situated at the eye position EP2 for watching the current video hologram, as shown in FIG. 7a. The hologram processor HP then detects in the course of its visibility check prior to the computation of the current video hologram, that both object light point OP3 and object light point OP4 are visible. The hologram processor also detects with the help of the ray tracing method that the holographic reconstruction system cannot provide a hologram region for the object light point OP1, which lies at the edge of the video hologram, as it would exceed the available surface of the cell structure. For this reason, the object light point OP1 is not considered in the computation of the current video hologram. This also saves computational load.

Spatial light modulators with a cell structure which allows spatial modulation with complex values or pure spatial phase modulation can for example be used as light modulator means.

A particular advantage of the present invention is that the reconstruction system can generally be realised without optical components which cause aberration. Instead, fast spatial phase light modulator means must be used which provide a multitude of modulated partial light waves for different eye positions for each video hologram of a moving video sequence with a large phase shift.

Details in the arrangement of the reconstruction system can be modified without deviating from the described basic principle of tracking the partial light waves and adapting the codes of the cell structure with the help of the hologram processor.

Because encoding prism terms makes great demands on the adjustable phase range in the cell structure, the reconstruction system can work with spatial light modulator means with multiple light modulators and/or additional optical means which realise a part of the prism function. In order to encode the prism terms, small apertures of the modulator must be provided. This requires a high resolution of the light modulator means and a great computing performance for computing the code values for the video holograms.

If, as a consequence of a high phase modulation shift of the spatial light modulator means, sufficiently large prism terms can be defined for the partial light waves of the hologram regions, the reconstruction system according to the present invention will generally not require optical focussing means.

However, if sufficiently large angles cannot be realised, there are various options to support the encoding of prism terms such that the modulated partial light waves emitted by all hologram regions in the modulator cell structure enter the visibility region for coincidence. On the one hand, the spatial light modulator means can be illuminated by a converging wave.

In another preferred embodiment of the reconstruction system according to the present invention, focussing means can be disposed in the optical path of the illumination wave, which dramatically reduces the demands on the encoding and adaptation range of the prism terms in the hologram regions of the modulator cell structure. The focussing means can for example be a field lens, lens array or array of diffractive optical elements.

It appears to those skilled in the art that his invention may as well be preferably applied to one of the above-described known reconstruction systems, which comprise optical focussing means in order to image illumination means for illuminating the light modulator means into a focal plane, where the eye is situated. Such a system defines the distance between the illumination means and focussing means, the focal length of the focussing means and the distance between the focal plane and the light modulator means. In order to also use eye positions which are at an axial distance to the focal plane in such a system, the effective focal length of the focussing means is preferably adapted with the help of the subject matter of the present invention. This is achieved in that the hologram processor computes a corrective lens function for each hologram region or for the entire cell structure and that said corrective lens function superimposes a corrected focal length $f_2=f_1 \pm f_{cor}$ on the code of the current video hologram when encoding the cell structure of the spatial light modulator means such that the encoding brings about a resulting total focal length $f_3$ of the system, which images the illumination means into the changed focal plane. If the optical focussing means have a focal length $f_1$, the focal length $f_2$ must be such that the following equation applies, given a negligible distance between the illumination means and lenticular: $1/f_3=1/f_1+1/f_2$.

The light modulator means can also comprise a separate light modulator for correcting the focal length of the system.

The invention claimed is:

1. A holographic reconstruction system for holographically reconstructing object elements of a scene, which system modulates at least one light wave field capable of generating interference with a sequence of video holograms, with the help of a discretely encodable cell structure of modulator cells of spatial light modulator means, said system comprising:
   hologram processor means for:
   assigning each object element of the scene with a discrete hologram region on the cell structure, whose extent and position depend on position information of the object element in the scene; and
   computing a code for each hologram region such that each hologram region on the cell structure modulates a partial light wave of the light wave field, and that each modulated partial light wave separately reconstructs the object element assigned to it and then propagates in the form of a light wave cone towards a visibility region; and
   position controller means for:
   directing the modulated partial light waves at at least one current eye position of an observer; and
   tracking it to a changing eye position when the observer moves, so that the fully reconstructed scene is visible in the visibility region for the current eye position;
   wherein the hologram processor means uses position information of the current eye position
   to adapt the extent and position of the hologram regions to the current eye position, and
   to compute the code such that each modulated partial light wave is directed to the current eye position, without light of parasitic diffraction orders entering a used diffraction order.

2. The holographic reconstruction system according to claim 1, where the hologram processor means consider the eye position information of the current eye positions in order to encode the cell structure dynamically such that the reconstruction system tracks the modulated partial light waves to the current eye position in a tracking range.

3. The holographic reconstruction system according to claim 1, where the hologram processor means encode the cell structure dynamically such that the light wave cones form a visibility region at the current eye position by way of coincidence and, if the eye positions change, track the reconstructed object elements by way of re-computing the code.

4. The holographic reconstruction system according to claim 3, where the visibility region has a predefined extent, and that the hologram processor means dynamically encode the cell structure such that the extent of the visibility region remains constant irrespective of the distance in front of the spatial light modulator means at which an observer is situated.

5. The holographic reconstruction system according to claim 1, where the hologram processor means compute a lens term for the hologram regions depending on the position of the corresponding reconstructed object element and depending on the eye position, and superimpose this lens term with a prism term for directing the reconstructed object element at the eye position.

6. The holographic reconstruction system according to claim 1, where the spatial light modulator means comprise at least one spatial light modulator which performs a spatial phase modulation of the wave field which is capable of generating interference.

7. The holographic reconstruction system according to claim 1, where the hologram processor means use information about a firmly defined structure of object light points of the scene and compute for each object light point a hologram region whose extent and position depends on both the axial distance of the object light point and the distance of the eye position to the spatial light modulator for each hologram region.

8. The holographic reconstruction system according to claim 7, where the modulator cell structure always carries a constant number of discrete hologram regions, irrespective of the content of the current video hologram.

9. The holographic reconstruction system according to claim 7, where number of discrete hologram regions depends on a pixel grid, which corresponds with the desired resolution of the holographic reconstruction in the visibility region.

10. The holographic reconstruction system according to claim 1, where the scene which is reconstructed with the help of the hologram regions remains at a fix position in space in relation to the current observer window.

11. The holographic reconstruction system according to claim 1, where the hologram processor means generate a new functional visibility region when the eye moves axially, in that the hologram processor means redefine the size and position of the hologram regions on the modulator cell structure and adapt the value of the encoded prism term to the current eye position.

12. The holographic reconstruction system according to claim 1, where the hologram processor means modify the code of the modulator cell structure when the position of the observer eye changes, in order to adapt the view of the reconstructed scene to the current eye position.

13. The holographic reconstruction system according to claim 1, where when the observer moves sideways from one eye position to another, the hologram processor means generally compute and encode such information about the position of the hologram regions on the modulator cell structure, that the position at which the scene is reconstructed changes in relation to the light modulator such that the scene exhibits an equal viewing space in the visibility region of each eye position.

14. The holographic reconstruction system according to claim 1, where the hologram processor means check the visibility of the object light points with the help of the ray tracing method if the eye position changes, and adapts the structure of the reconstructed object light points depending on the current eye position.

15. The holographic reconstruction system according to claim 1, where a light wave field which propagates in a converging manner illuminates the spatial light modulator means.

16. The holographic reconstruction system according to claim 1 with a focussing display screen for projecting the light source onto the observer eye.

* * * * *